United States Patent
Leonard

[11] 3,841,192
[45] Oct. 15, 1974

[54] CHORD TRANSPOSING AND FINGERING DIAL

[76] Inventor: Verna M. Leonard, 8701 Hwy. 41, Fresno, Calif.

[22] Filed: Feb. 22, 1974

[21] Appl. No.: 444,894

[52] U.S. Cl. .................................... 84/485, 84/474
[51] Int. Cl. .......................................... G10b 15/00
[58] Field of Search ............................. 84/470–485

[56] References Cited
UNITED STATES PATENTS

| | | | |
|---|---|---|---|
| 375,496 | 12/1887 | Mason | 84/480 |
| 741,017 | 10/1903 | Curtiss | 84/480 |
| 954,436 | 4/1910 | Hunter | 84/474 |
| 2,663,211 | 12/1953 | Wallace | 84/485 |

Primary Examiner—Lawrence R. Franklin
Attorney, Agent, or Firm—Ralph S. Branscomb

[57] ABSTRACT

A device for demonstrating chord structure in the various key signatures and showing the preferred breakdown or division of the chord as between the right and left hands on a keyboard as required in playing polychords. Two dials are concentrically arranged on a panel, the dials being divided into the same number of segments and the information on the two dials being substantially the same, to wit, an array in each segment showing the root, third, fifth, seventh, eleventh and thirteenth for a particular key signature, and each array can be aligned with or juxtaposed with a numerical degree array on the panel for complete polychord analysis and also selectively aligned with two other partial and complementary arrays on the panel, to show the specific breakdown or division of the chord for the right and left hand playing of the chord on a keyboard.

5 Claims, 2 Drawing Figures

CHORD TRANSPOSING AND FINGERING DIAL

BACKGROUND OF THE INVENTION

The theory of how polychords should be divided for left and right hand playing, as such, is generally accepted and of course the tones in the different chords are more or less fixed by custom. This inflexibility obviously does not preclude wide choice between the chords of different degrees and choice as between major, minor, diminished and augmented chords and the present invention can be extended and applied to such chords.

SUMMARY OF THE INVENTION

As claimed, the device comprises a pair of dials coaxially mounted on a panel, the dials being similar except the outer dial is smaller to expose a peripheral portion of the inner larger dial, the dials being divided into an equal number of segments, preferably 12 to correspond with the 12 accepted key signatures, each segment having an array of the scale tones for one key signature. The panel has an array of scale degrees numerically named to indicate chord and polychord structure and arranged so that the arrays of scale tones can be selectively aligned therewith for reading the same, and the panel also has two partial, complementary scale degree arrays showing the left and right hand divisional parts of the polychords so that the dials can be adjusted to indicate this division for each key signature to indicate proper fingering and to assist in transposing music from one key to another.

DETAILED DESCRIPTION OF A PREFERRED EMBODIMENT

Figure 1:
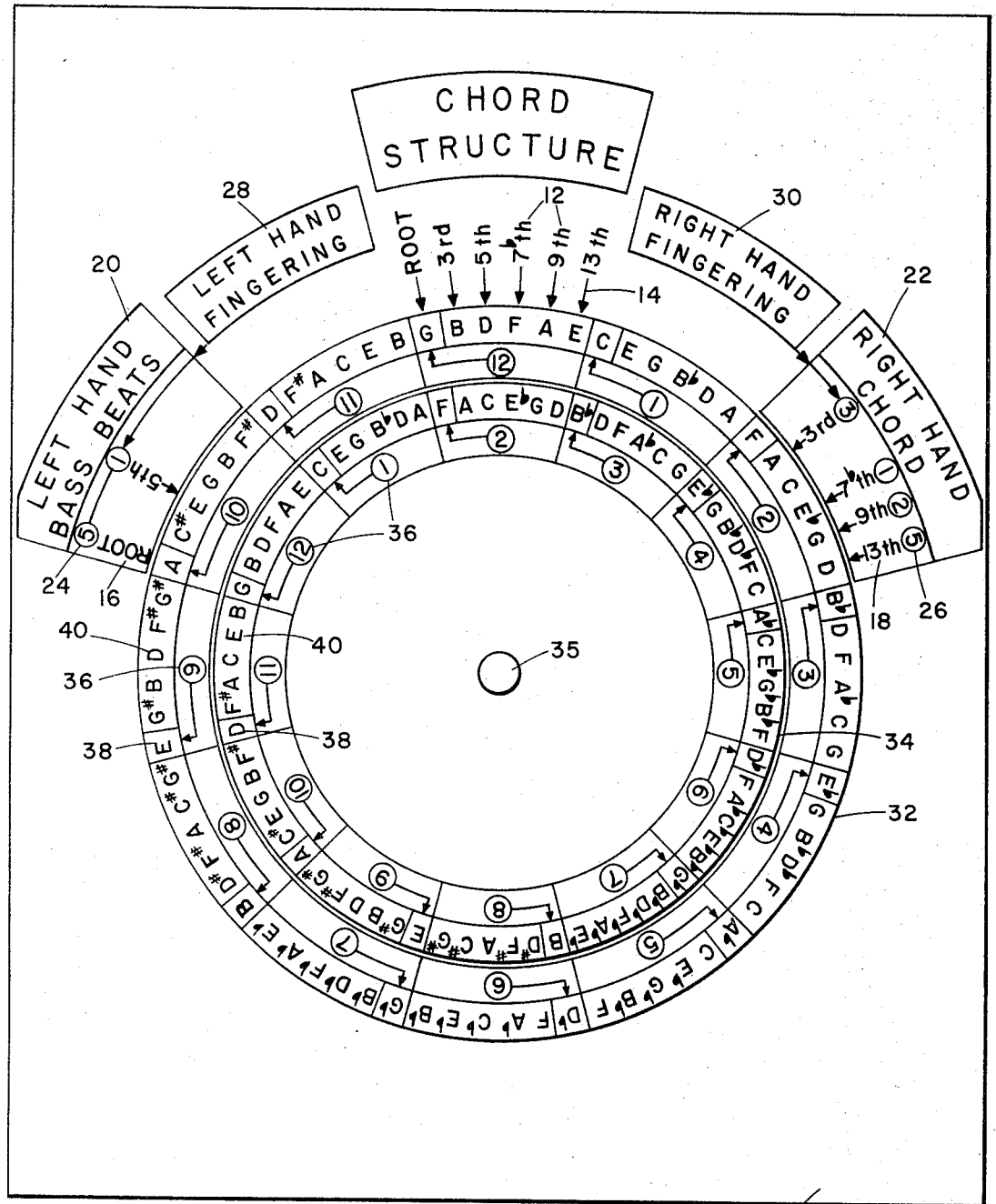
FIG. 1 is a front view of the transposing and fingering dial.
Figure 2:
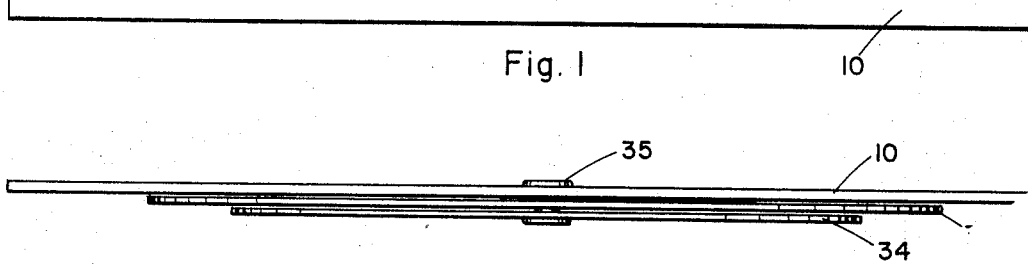
FIG. 2 is a top edge view of the device.

As illustrated, the item will be constructed from sheet material, ordinarily paper or plastic, and comprises a flat panel 10 which may be rectangular as shown and reasonably form-retaining. The panel is provided with indicia, printed thereon or otherwise applied thereto, to indicate a complete chord and polychord structure; numerically showing the Root, third, fifth, seventh, ninth, and eleventh chord and polychord numerical names, the same as scale degrees, as an array 12, with corresponding spaced pointers or arrows 14 arranged in an arc.

At either side of the array 12 these are provided similar but partial arrows 16–18 which are complementary to each other and together point out all the numerical names for the same chords and polychords. Specifically, the partial array 16 points out the Root and fifth as "Left hand" at 20, thus indicating to the user that the left hand plays the corresponding keys on a keyboard, while the partial array 18 carries the legend "Right hand" 22 to indicate that the right hand should play the remaining portion of any such selected chord or polychord.

The fingering of the keys in the partial arrays 16 and 18 is also indicated at 24 and 26 with suitable legends 28 and 30 on the panel. Conventional numbering for this fingering is employed. The partial arrays 16, 18 are arcuate about the same center as the array 12.

Two dials, a larger dial 32 and a smaller dial 34, are coaxially mounted by a pivot pin 35 on the panel 10 centrally within the common arc of the arrays 12, 16 and 18, the periphery of the larger disc being close to said arrays and the smaller disc 34 being disposed outwardly of the larger and dimensioned to expose a peripheral portion of the larger disc 32.

Both discs have peripheral portions divided into segments or sectors, preferably 12 in number, and these may be numbered as at 36 for ease in relating the corresponding segments of the two discs. This numbering 36 may be made to identify the root tones or key signatures 38 of a similar number of scale tone arrays 40 of polychords represented in the particular segment.

In using the device either dial can be rotatively adjusted to align the desired key signature with the root position shown in the array 12 to show the entire polychord structure for the key signature concerned. Then the proper breakdown or division of the polychord, presuming that more than a simple trial is to be played, can be found by adjusting the dials so that one dial points out the tones to be played by the left hand and the outer dial points out the tones to be played by the right hand, with the fingering also indicated by the numerals 24, 26.

The numbering 36 speeds the adjustment because of its simplicity. For example, in the illustrated disposure of the dials in FIG. 1, the smaller dial 34 has been moved to show the left hand fingering, and bass beats involved, for the key signature G, numbered 12, while the larger dial is adjusted to show the complete polychord structure for the same key signature. It will be understood that the larger dial 32 can now be shifted to the "Right hand" position to show the remaining polychord structure and fingering. Any other key signature can be likewise demonstrated. In using the device for transposing of music the two dials may be set to show the corresponding chords or polychords in different key signatures.

I claim:

1. Means for instant determination of polychords in different keys and the normal breakdown into left hand and right hand fingering of the polychords in any one key as well as corresponding simultaneous determination and breakdown of similar chords in other keys, said means comprising:

a panel having a smaller dial and a larger dial coaxially mounted thereon for relative rotation, with the smaller dial outermost so that peripheral portions of the larger dial are visible;

said dials having the peripheral portions thereof divided into sectors, said sectors indicating separate tone name arrays for polychords and chords in different keys;

said panel having a scale degree array visible beyond the said tone name arrays and readable in conjunction with any one of said tone name arrays on one of said dials;

a left-hand fingering indicator and partial scale degree array and a right-hand fingering indicator and partial scale degree array, all on said panel and visible beyond said dials;

whereby adjustment of one of said dials to dispose the tone names for a particular key in juxtaposition with the first-mentioned scale degree array indicates the tone name — scale degree relationship for that particular key, and whereby selective adjustment of both of said dials with substantial juxtaposition with said partial scale degree arrays indicates the fingering breakdown for corresponding polychords in the same or other keys.

2. Means according to claim 1 wherein the number of said sectors in each dial is 12.

3. Means according to claim 1 wherein the corresponding sectors in the two dials are identically numbered for easy selection of the sectors in adjusting the dials.

4. Means according to claim 1 wherein said partial arrays are strictly complementary with the root and fifth in the left hand array and the remainder of the polychords in the right hand array.

5. Means according to claim 1 wherein indicia to show fingering sequences are applied to said panel adjacent said partial arrays.

* * * * *